(12) United States Patent
Ovadia et al.

(10) Patent No.: US 7,684,806 B2
(45) Date of Patent: Mar. 23, 2010

(54) DEVICE, SYSTEM AND METHOD OF POINT TO MULTIPOINT COMMUNICATION

(75) Inventors: Yakir Ovadia, Raanana (IL); Nadav Shulman, Raanana (IL); Daniel Yellin, Ra'anana (IL); Sharon Levy, Hadera (IL); Yona Perets, Ra'anana (IL)

(73) Assignee: Intel Corporation, Santa Clara, CA (US)

( * ) Notice: Subject to any disclaimer, the term of this patent is extended or adjusted under 35 U.S.C. 154(b) by 691 days.

(21) Appl. No.: 11/283,536

(22) Filed: Nov. 21, 2005

(65) Prior Publication Data
US 2007/0117569 A1    May 24, 2007

(51) Int. Cl.
*H04W 72/00* (2009.01)
(52) U.S. Cl. .............. 455/450; 455/452.1; 455/516; 455/509
(58) Field of Classification Search ............. 455/450, 455/452.1, 453, 509, 515, 452.2, 516
See application file for complete search history.

(56) References Cited

U.S. PATENT DOCUMENTS

| | | | |
|---|---|---|---|
| 6,459,901 B1* | 10/2002 | Chawla et al. | 455/450 |
| 6,934,268 B1* | 8/2005 | Hedlund et al. | 370/311 |
| 7,328,019 B2 | 2/2008 | Nishikawa et al. | |
| 2002/0160812 A1* | 10/2002 | Moshiri-Tafreshi et al. | 455/561 |
| 2003/0040319 A1* | 2/2003 | Hansen et al. | 455/452 |
| 2003/0123425 A1* | 7/2003 | Walton et al. | 370/341 |
| 2004/0203476 A1 | 10/2004 | Liu | |
| 2004/0224697 A1 | 11/2004 | Hakkinen et al. | |
| 2005/0030911 A1* | 2/2005 | Tiedemann et al. | 370/278 |
| 2005/0124350 A1* | 6/2005 | Wu | 455/452.2 |
| 2005/0157687 A1* | 7/2005 | Heo et al. | 370/335 |
| 2005/0157876 A1 | 7/2005 | Jeong et al. | |
| 2005/0249127 A1 | 11/2005 | Huo et al. | |
| 2006/0023650 A1 | 2/2006 | Dominique et al. | |
| 2006/0205414 A1* | 9/2006 | Teague | 455/452.1 |

FOREIGN PATENT DOCUMENTS

| | | |
|---|---|---|
| WO | WO 00/21246 | 4/2000 |
| WO | WO 2005/020473 | 3/2005 |

OTHER PUBLICATIONS

International Search Report of PCT/US2006/044302 dated Apr. 26, 2007.
U.S. Appl. No. 11/136,476, filed May 25, 2005, Perets et al.
Gesbert et al., "How much feedback is multi-user diversity really worth?", In Proceedings of IEEE Intern. Conf. On Communications (ICC), 2004, pp. 1-5.

(Continued)

*Primary Examiner*—Charles N Appiah
*Assistant Examiner*—Kwasi Karikari
(74) *Attorney, Agent, or Firm*—Shiloh et al.

(57) ABSTRACT

Some embodiments of the invention provide devices, systems and methods of point to multipoint communication. For example, an apparatus in accordance with an embodiment of the invention includes a resource allocator to allocate a wireless communication channel resource to one or more stations of a wireless communication system based on a net benefit function that takes into account an overhead incurred by controlling the allocation of said channel resource.

25 Claims, 4 Drawing Sheets

OTHER PUBLICATIONS

3GPP TSG-RAN WG1 #43 R1- 051500, Nov. 7-11, 2005, Seoul, Korea, QUALCOMM Europe, Evaluation of OFDM based E-UTRA downlink with partial feedback sub-band scheduling, pp. 1-7.
3GPP TSG RAN1#43 R1-051334, Seoul, Korea, Nov. 7-11, 2005, Motorola, CQI Feedback Scheme for EUTRA, pp. 1-9.
Hassel et al., "Exploiting Multiuser Diversity Using Multiple Feedback Thresholds", Vehicular Technology Conference (VTC) 2005, In proceedings, pp. 1-5.
Office Action of U.S. Appl. No. 11/136,476 mailed on Jun. 4, 2008.
Rapporteur, "Agreed Text Proposals for the Requirement TR", RP050155, RAN meeting #27, Tokyo, Japan Mar. 9-11, 2005.
The IEEE 802.16 Working Group on Broadband Wireless Access Standards http://ieee802.org/16/.
R1-050251, "Uplink Considerations for UTRAN LTE", Nokia, 3GPP TSG RAN WG1#40bis, Beijing, China, Apr. 4-8, 2005.
C.Garnier et al., "Performance of an OFDM-SDMA based System in a Time-Varying Multi-Path Channel", IEEE, 2001, pp. 1686-1690.
Das S. et al., Institute of Electrical and Electronics Engineers: "An Efficient Sub-Carrier and Rate Allocation Scheme for M-QAM Modulated Uplink OFDMA Transmission", Conference Record of The $37^{th}$ Asilomar Confrence on Signals, System & Computers, vol. 1 of 2, Conf. 37, pp. 136-140, 2003.
International Search Report for PCT/US2006/020822 mailed Sep. 21, 2006.
Keunyoung Kim et al., Iterative and Greedy Resource Allocation in an Uplink OFDMA system, Personal, Indoor and Mobile Radio Communications, 2004, IEEE vol. 4, pp. 2377-2381.
Sternad M., Aronsson D., "Channel Estimation and Prediction for Adaptive FDM Downlinks OFDMA/TDMA Uplinks, Based on Overlapping Pilots" Acoustics, Speech, and Signal processing, 2005, International Conference on Philadelphia, Pennsylvania, USA, Mar. 2005.
Toufik I et al., "Channel Allocatin Aligorithms for Multi-Carrier System" Vehicular Technology Conference, 2004, pp. 1129-1133.
R1-050266, "Proposal for the uplink multiple access scheme for E-UTRA", Nortel, 3GPP TSG RAN WG1#40bis, Beijing, China, Apr. 4-8, 2005.

* cited by examiner

DEVICE, SYSTEM AND METHOD OF POINT TO MULTIPOINT COMMUNICATION

BACKGROUND OF THE INVENTION

In some wireless communication systems, for example, Code Division Multiple Access (CDMA) systems and Wideband CDMA (WCDMA) systems, multiple wireless communication stations may share an access medium. For example, time and/or frequency resources may be shared among multiple devices, e.g., utilizing Orthogonal Frequency-Division Multiplexing (OFDM).

A central point of the wireless communication system, for example, an access point or a servicing station associated with multiple mobile stations, may allocate communication channel resources to the mobile stations, e.g., by transmitting control information. Unfortunately, overhead may be incurred due to exchanging and/or handling of control information.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

It should be understood that embodiments of the invention may be used in a variety of applications. Although the invention is not limited in this respect, embodiments of the invention may be used in conjunction with many apparatuses, for example, a transmitter, a receiver, a transceiver, a transmitter-receiver, a wireless communication station, a wireless communication device, a wireless Access Point (AP), a modem, a wireless modem, a personal computer, a desktop computer, a mobile computer, a laptop computer, a notebook computer, a Personal Digital Assistant (PDA) device, a tablet computer, a server computer, a network, a Local Area Network (LAN), a Wireless LAN (WLAN), devices and/or networks operating in accordance with existing IEEE 802.11, 802.11a, 802.11b, 802.11e, 802.11g, 802.11i, 802.11n, 802.16 standards and/or future versions of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), or the like. Embodiments of the invention may be used in various other apparatuses, devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, parameters, or the like. For example, "a plurality of stations" may include two or more stations.

Although embodiments of the invention are not limited in this regard, the terms "resources", "channel resources" and/or "communication channel resources" as used herein may include, for example, frequency slots, time slots, time/frequency slots, frequency ranges or bins, clusters of frequency bins, bands, sub-bands, channels, sub-channels, links, wireless communication links, portions of the spectrum, transmission channel resources, reception channel resources, transmission/reception channel resources, or the like.

Although embodiments of the invention are not limited in this regard, the terms "cost" and/or "overhead" as used herein may include, for example, processing cycles, processing power, bandwidth, power consumption, energy consumption, additional time involved in performing an operation, additional processing cycles involved in performing an operation, additional bandwidth involved in exchanging a data item, performance delays, transmission overhead, reception overhead, processing overhead, information exchange overhead, or the like.

Although embodiments of the invention are not limited in this regard, the term "taking into account", e.g., of a data item or a parameter, as used herein, may include, for example, performing processing and/or calculation operations that are at least partially based on the data item or parameter, or performing processing and/or calculation operations utilizing a function or an equation which includes at least the data item or parameter and optionally other data items and/or parameters.

Figure 1:
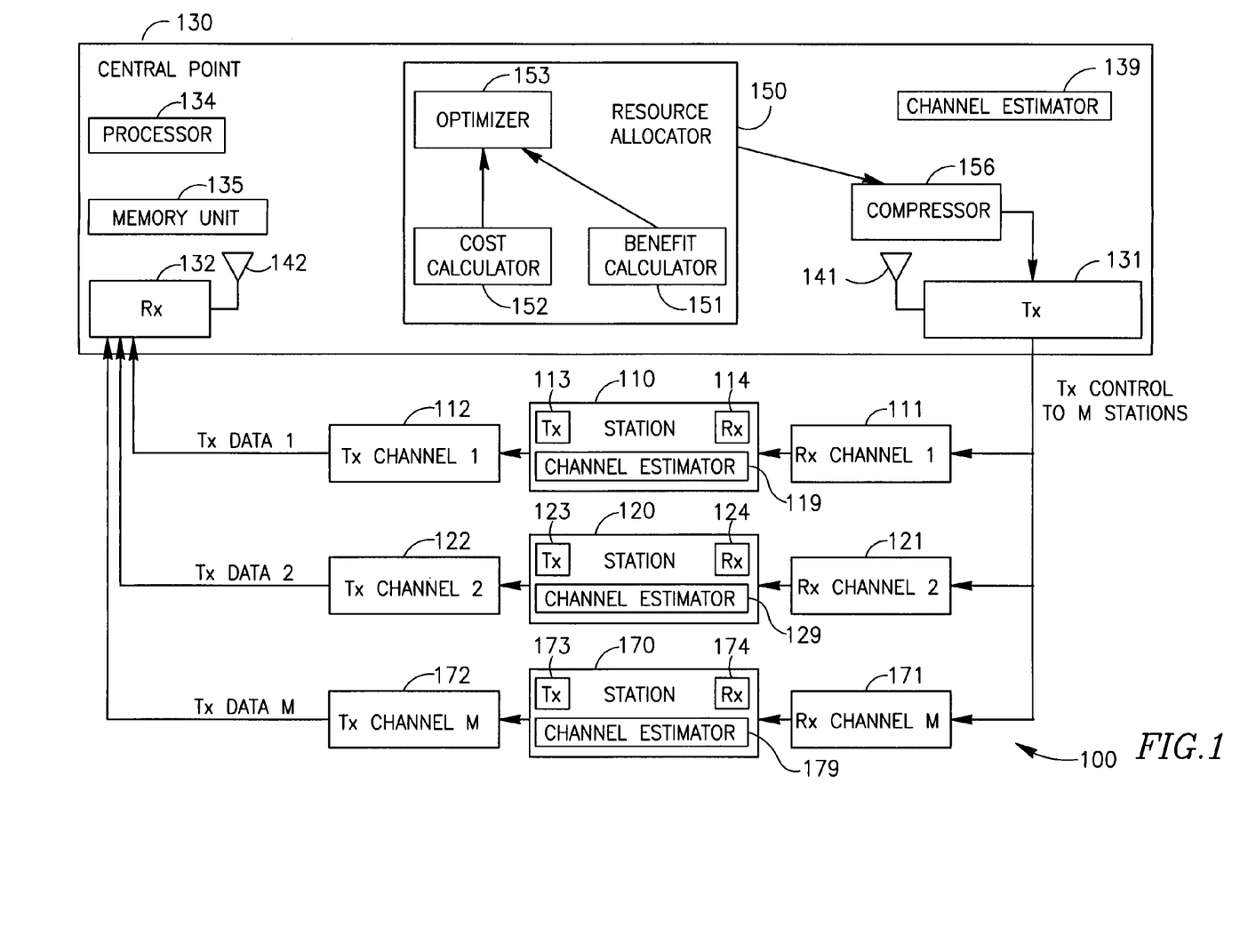
FIG. 1 is a schematic block diagram illustration of a system of point to multipoint control in accordance with an embodiment of the invention.

FIG. 1 schematically illustrates a system 100 of point to multipoint control in accordance with an embodiment of the invention. System 100 may include, for example, a Center Point (CP) 130, e.g., a servicing station, a base station, an access point, or the like. System 100 may further include one or more mobile stations, e.g., mobile stations 110, 120 and 170. In some embodiments, for example, system 100 may include M mobile stations; in the demonstrative embodiment shown in FIG. 1, for example, M may be equal to three.

Mobile stations 110, 120 and/or 170 may include, for example, a wireless communication station, a wireless communication device, a portable or mobile communication device, a cellular phone, a mobile phone, a mobile computing platform, a laptop computer, a notebook computer, a PDA device, or the like. For example, mobiles stations 110, 120 and 170 may include wireless transmitters 113, 123 and 173, and wireless receivers 114, 124 and 174, respectively.

CP 130 may include, for example, a transmitter 131, a receiver 132, a processor 134, and a memory unit 135. CP 130 may include other suitable hardware components and/or software components.

Transmitter 131 may include, for example, a Radio Frequency (RF) transmitter able to transmit RF signals, e.g., using an antenna 141. Receiver 132 may include, for example, a RF receiver able to receive RF signals, e.g., using an antenna 142. In some embodiments, transmitter 131 and receiver 132 may be implemented as a transceiver, a transmitter-receiver, a wireless modem, or one or more units able to perform separate or integrated functions of sending and/or receiving wireless communication signals, blocks, frames, data items, transmission streams, packets, messages and/or data.

Antenna 141 and/or antenna 142 may include, for example, an internal and/or external RF antenna. In some embodiments, for example, antenna 141 and/or antenna 142 may include a dipole antenna, a monopole antenna, an omni-directional antenna, an end fed antenna, a circularly polarized antenna, a micro-strip antenna, a diversity antenna, or any other type of antenna suitable for sending and/or receiving wireless communication signals, blocks, frames, data items, transmission streams, packets, messages and/or data.

Processor 134 may include, for example, a Central Processing Unit (CPU), a Digital Signal Processor (DSP), a microprocessor, a controller, a chip, a microchip, an Integrated Circuit (IC), or any other suitable multi-purpose or specific processor or controller.

Memory unit 135 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units.

Mobile stations 110, 120 and 170 may transmit data to CP 130 through transmit channels 112, 122 and 172, respectively. The data transmitted by mobile stations 110, 120 and 170 may be received by receiver 132 of CP 130, and may be processed by processor 134 of CP 130.

CP 130 may further include a channel estimator 139 to perform channel estimation of transmit channels 112, 122 and 172 utilized by mobile stations transmitters 113, 123 and/or 173, respectively, for transmitting wireless signals to CP 130.

Transmitter 131 of CP 130 may transmit control information to mobile stations 110, 120 and 170. The control information may be received by mobile stations 110, 120 and 170 through receive channels 111, 121 and 171, respectively. In some embodiments, mobile stations 110, 120 and 170 may include channel estimators 119, 129 and 179, respectively, for example, to perform channel estimation of receive channels 111, 121 and 171, respectively.

The control information may, for example, instruct or indicate to mobile station 110 to utilize one or more transmission and/or reception channel resources, e.g., a frequency, a frequency slot, a frequency range or bin, a cluster or frequency bins, or the like. The control information may include other suitable parameters, e.g., one or more parameters indicating transmission and/or reception channel resource allocation to stations 110, 120 and/or 170, one or more parameters instructing a mobile station which portion of the spectrum to use for transmitting and/or receiving wireless signals, or other parameters indicating channel resource allocation in a frequency-domain multi-user diversity. For example, in one embodiment, the control information may include data or parameters generated by a channel resource allocator 150 of CP 130. Mobile stations 110, 120 and/or 170 may utilize frequencies or other communication channel resources for transmission and/or reception, or may modify one or more operational parameters of stations 110, 120 and/or 170, based on the control information received from CP 130.

In accordance with some embodiments, optionally, prior to its transmission by transmitter 131 of CP 130, the control information may be compressed or encoded by a compressor 156 of CP 130, e.g., as described in detail below with reference to FIGS. 3-5. Compressor 156 may include, for example, a hardware compression unit and/or a software compression module, and may optionally be implemented as part of processor 134 or as a stand-alone sub-unit of CP 130. The compressed control information may be decompressed or decoded by mobile stations 110, 120 and/or 170 upon reception. Compressor 156 may utilize, for example, one or more compression schemes as described herein with reference to FIGS. 3-5, and/or other suitable compression or encoding algorithms.

In some embodiments, resource allocator 150 of CP 130 may be able to allocate transmission and/or reception channel resources to mobile stations 110, 120 and/or 170 at various permutations. For example, in a first permutation, a first frequency slot may be allocated to mobile station 110, a second frequency slot may be allocated to mobile station 120, and a third frequency slot may be allocated to mobile station 170. In a second permutation, for example, the first frequency may be allocated to mobile station 120, the second frequency may be allocated to mobile station 110, and a fourth frequency may be allocated to mobile station 170. In some embodiments, for example, resource allocator 150 may allocate communication channel resources taking into account or based on a channel quality value or a channel quality indicator associated with utilization of a certain communication channel resource by a mobile station, e.g., a Signal to Noise Ratio (SNR) parameter, or the like; for example, in one embodiment, resource allocator may allocate to mobile station 110 a frequency slot in which mobile station 110 has the highest, or a relatively high, SNR value.

CP 130 may further include, for example, a benefit calculator 151, a cost calculator 152, and an optimizer 153. Benefit calculator 151, cost calculator 152 and/or optimizer 153 may include, for example, one or more hardware units and/or a software module able to perform calculation and/or estimation operations. Benefit calculator 151, cost calculator 152 and/or optimizer 153 may optionally be implemented as part of processor 134, as part of allocator 150, or as one or more stand-alone sub-units of CP 130.

The benefit calculator 151, for example, may calculate one or more estimated or actual gross benefit parameters associated with utilizing a certain communication channel resource (e.g., a frequency slot) by a certain mobile station, or associated with one or more possible allocation permutations calculated by resource allocator 150. The gross benefit parameters may include, for example, throughput, Quality of Service (QoS), priority, or the like. A gross benefit parameter calculated by benefit calculator may be denoted GrossBenefit.

The cost calculator 152, for example, may calculate one or more estimated or actual cost parameters associated with utilizing a certain communication channel resource (e.g., a frequency slot) by a certain mobile station, or associated with one or more possible allocation permutations calculated by resource allocator 150. The cost parameters may include, for example, bandwidth overhead and/or processing overhead associated with transmitting, receiving and/or processing control information by CP 130 and/or one or more mobile station(s). A cost parameter calculated by cost calculator 152 may be denoted ControlCost. In one embodiment, for example, ControlCost may be calculated based on the total throughput dedicated to control substantially all stations (e.g., stations 110, 120 and 170), and may be represented in bits per second or other units.

Optimizer 153 may utilize one or more optimization functions, e.g., a net benefit function, to improve or optimize one or more parameters of system 100 or of one or more components of system 100. For example, optimizer 153 may select an allocation permutation associated with the highest global throughput, or with the highest throughput of one or more mobile stations, optionally taking into account or based on the cost (e.g., overhead) associated with exchanging and/or processing control information. Optimizer 153 may further, optionally, take into account or based on the cost (e.g., overhead) associated with exchanging and/or processing receive-channel feedback data, denoted FeedbackCost, as detailed herein below.

For example, in some embodiments, optimizer 153 may subtract the cost parameter(s) Cost estimated by cost calculator 152 from the gross benefit parameter(s) GrossBenefit estimated by benefit calculator 151, resulting in a net benefit parameter, denoted Netbenefit. In one embodiment, for example, the net benefit parameter may be equal to a total throughput of mobile stations 110, 120 and 170 in a specific allocation permutation, having subtracted therefrom the total cost or overhead associated with exchanging control information to establish communication in accordance with that specific allocation permutation.

For example, in one embodiment, optimizer 153 may utilize the following equation, in which ControlCost is subtracted from GrossBenefit to result in NetBenefit:

$$\text{NetBenefit}=\text{GrossBenefit}-\text{ControlCost} \quad \text{Equation 1}$$

In another embodiment, for example, optimizer 153 may utilize an optimization function in which NetBenefit is a function, denoted F, of GrossBenefit and ControlCost, e.g., utilizing the following equation:

$$\text{NetBenefit}=F(\text{GrossBenefit},\text{ControlCost}) \quad \text{Equation 2}$$

In still another embodiment, for example, optimizer 153 may utilize the following equation, in which ControlCost and FeedbackCost are subtracted from GrossBenefit to result in NetBenefit:

$$\text{NetBenefit}=\text{GrossBenefit}-\text{ControlCost}-\text{FeedbackCost} \quad \text{Equation 3}$$

In yet another embodiment, for example, optimizer 153 may utilize an optimization function in which NetBenefit is a function of GrossBenefit, ControlCost and FeedbackCost, e.g., utilizing the following equation:

$$\text{NetBenefit}=F(\text{GrossBenefit},\text{ControlCost},\text{FeedbackCost}) \quad \text{Equation 4}$$

Other suitable equations and/or functions may be used in accordance with embodiments of the invention.

Optimizer 153 may utilize one or more optimization criteria, optimization functions or net benefit function(s), which may take into account, for example, throughput of one or more mobile stations, total or cumulative throughput of substantially all stations of system 100, total or cumulative throughput of substantially all components of system 100 (e.g., including CP 130), Quality of Service (QoS) parameters associated with one or more stations or components of system 100, priority parameters associated with one or more stations or components of system 100, or the like. This may allow CP 130 to use a scheduling technique based on a cost/benefit optimization function, which may take into account, for example, total system throughput, individual (e.g., local) throughput of one or more stations, overhead associated with exchanging and/or handling control information, overhead associated with exchanging and/or handling receive-channel feedback data, or the like. The optimization function or net benefit function may be adapted, for example, to optimize or improve throughput, total system throughput, individual component throughput, throughput of a set of system components, Quality of Service (QoS) or a QoS-related parameter, revenue(s) associated with one or more communication channel resources, or the like.

In some embodiments, for example, optimizer 153 may determine that a channel resource allocation permutation has the highest net benefit value, a relatively high net benefit value, a net benefit value greater than a threshold value, or the like. In one embodiment, for example, the net benefit parameter may be equal to the total transmit throughput of mobile stations 110, 120 and 170 that may be achieved by a specific channel resource allocation, after subtracting the total cost of exchanging and/or processing control information required for establishing that specific channel resource allocation. Other suitable parameters or calculations may be used by optimizer 153.

Resource allocator 150 may allocate the communication channel resource in accordance with the allocation permutation determined by optimizer 153, to provide optimal or improved performance of system 100 or of component(s) thereof. For example, the allocation permutation determined by optimizer 153 may optimize or improve total throughput, individual throughput, QoS, or other parameter(s). Accordingly, transmitter 130 may transmit control information including parameters instructing mobile stations 110, 120 and 170 to operate in accordance with the determined resource allocation permutation. In response, mobile stations 110, 120 and 170 may operate in accordance with the control information received from CP 130, for example, by modifying an operational parameter of mobile stations 110, 120, 170, e.g., utilizing a newly-allocated frequency slot instead of a previously-allocated frequency slot, modifying a transmission power level, or the like.

In some embodiments, cost calculator 152 may store calculated cost parameters using one or more tables, lookup tables, lists, files, matrixes, or the like, e.g., stored in memory unit 135. For example, Table 1 shows a demonstrative cost parameters storage in accordance with an embodiment of the invention:

TABLE 1

|  |  | Communication Resources | | | |
|---|---|---|---|---|---|
|  |  | 1 | 2 | ... | N |
| Mobile Stations | 1 | C11 | C21 | ... | CN1 |
|  | 2 | C12 | C22 | ... | CN2 |
|  | ... | ... | ... | ... | ... |
|  | M | C1M | C2M | ... | CNM |

In Table 1, the rows indicate multiple mobile stations, and the columns indicate multiple communication channel resources, e.g., frequency slots that may be allocated to the mobile stations. For example, the table cell located at row 1, column 1, may store a calculated cost parameter associate with utilization of communication channel resource 1 by mobile station 1; the table cell located at row 1, column 2, may store a calculated cost parameter associate with utilization of communication channel resource 2 by mobile station 1; the table cell located at row 2, column 1, may store a calculated cost parameter associate with utilization of communication channel resource 1 by mobile station 1; the table cell located at row M, column N, may store a calculated cost parameter associate with utilization of communication channel resource N by mobile station M; etc.

In some embodiments, for example, optimizer 153 may determine that a resource allocation permutation has the lowest total cost, a relatively low total cost, a total cost lower than a threshold, or the like. In one embodiment, for example, optimizer 153 may calculate a total cost for multiple allocation permutations, e.g., for substantially all possible allocation permutations, to select the allocation permutation having the lowest or relatively low total cost. In some embodiments, for example, optimizer 153 may determine that a specific allocation permutation has the largest value of (GrossBenefit−ControlCost), or the largest value of (GrossBenefit−ControlCost−FeedbackCost). Other suitable tables or calculations may be used; for example, in addition to or instead of utilizing Table 1, optimizer 153 may utilize a list of total costs associated with one or more resource allocation permutations.

In some embodiments, benefit calculator 151 may optionally store calculated gross benefit parameters (e.g., throughput, QoS, or the like) using one or more tables, lookup tables, lists, files, matrixes, or the like, e.g., stored in memory unit 135. For example, benefit calculator 151 may utilize a table, e.g., similar to Table 1, to store benefit parameters associated with utilizing communication channel resources by a mobile stations. Other suitable tables or calculations may be used; for example, in addition to or instead of utilizing such table, optimizer 153 may utilize a list of total benefit parameters associated with one or more resource allocation permutations. In some embodiments, optimizer 153 may utilize one or more algorithms, for example, a genetic algorithm, an assignment algorithm, a Munkres' assignment algorithm, a sequential assignment algorithm, a concurrent assignment algorithm, or the like.

In one embodiment, optimizer 153 may evaluate the benefit and the cost of one or more allocation permutations, for example, by taking into account the total gross benefit of system 100 (e.g., total throughput of system 100), after subtracting the total control cost (e.g., of system 100), and optionally after subtracting the total Rx feedback cost (e.g., of system 100). In another embodiment, optimizer 153 may evaluate the benefit and the cost of one or more allocation permutations, for example, by taking into account an individual benefit of a component of system 100 (e.g., individual throughput of one or more, specific, mobile station(s)) after subtracting the total control cost (e.g., of system 100), and optionally after subtracting the total Rx feedback cost (e.g., of system 100).

In some embodiments, optimizer 153 may optionally store calculated net benefit parameters (e.g., total throughput having subtracted therefrom total control overhead) using one or more tables, lookup tables, lists, files, matrixes, or the like, e.g., stored in memory unit 135. For example, optimizer 153 may utilize a list of net benefit parameters associated with one or more resource allocation permutations, e.g., to select a resource allocation permutation associated with the highest, or a relatively high, net benefit parameter.

In some embodiments, non-compressed control information may be periodically transmitted by CP 130 to mobile stations 110, 120 and 170. For example, in one embodiment, a control information item having a size of K bits may be transmitted by CP 130 to a mobile station. In this embodiment, transmission of control information to M mobile stations may require transmission of M·K bits. For example, in an embodiment wherein system 100 includes 64 mobile stations (i.e., M equals 64), a control information item may have a size of 6 bits (e.g., K equals 6), a control period may be equal to two milliseconds, and therefore non-compressed control information exchange may require approximately 192 kilobits per second (64 multiplied by 6, divided by 0.002). In one embodiment, the overall frequency band or spectrum used by system 100 may be divided into N communication channel resources (e.g., sub-bands), such that a first mobile station may utilize a first communication channel resource, a second mobile station may utilize a second communication channel resource, etc.; in such case, for example, K may be equal to $\lceil Log_2 N \rceil$.

In some embodiments, the control information may be compressed and/or encoded by CP 130 prior to transmission, and may be decompressed and/or decoded by mobile stations 110, 120 and/or 170 upon reception. For example, mobile station 110 may be utilized by a slowly-moving or relatively slowly-moving user, e.g., a pedestrian or a slowly-moving vehicle. In such case, the channel resource allocation for mobile station 110 may remain substantially unmodified for a specific period of time, and may not require updating or modifying. For example, in one embodiment utilizing a control period of two milliseconds, a mobile station moving at an average velocity of approximately three kilometers per hour, may maintain its allocated communication channel resource (e.g., frequency slot), and need not receive control information to modify its allocated communication channel resource, for a time period of approximately 83.3 milliseconds.

In one embodiment, if CP 130 estimates that an overall throughput of system 100 may not increase by modifying current channel resource allocations, CP 130 may determine that re-allocation of communication channel resources is not required, thereby minimizing or reducing overhead associated with exchange of control information. In such case, for example, previously-allocated communication channel resources may be maintained by the mobile stations.

Figure 2:
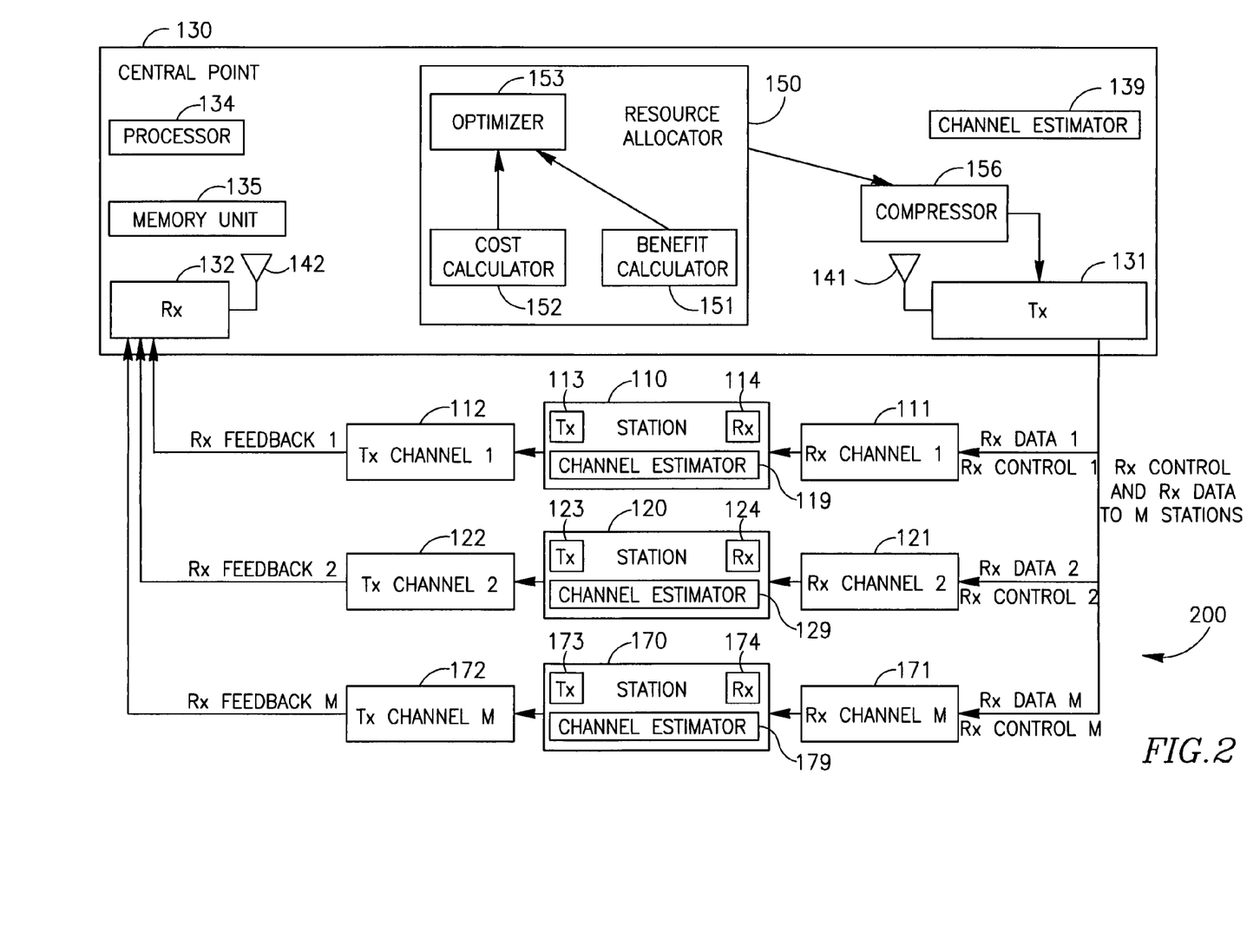
FIG. 2 is a schematic block diagram illustration of a system of point to multipoint control in accordance with another embodiment of the invention.

FIG. 2 schematically illustrates a system 200 of point to multipoint control in accordance with another embodiment of the invention. The components of system 200 may be, for example, substantially identical or similar to the components of system 100 of FIG. 1, respectively.

In system 200, CP 130 may transmit to mobile stations 110, 120 and 170 data ("Rx data") through receive channels 111, 121 and 171, respectively. CP 130 may further transmit to mobile stations 110, 120 and 170 control information related to reception communication resources intended for utilization ("Rx control information") through receive channels 111, 121 and 171, respectively. For example, the Rx control information transmitted by CP 130 to mobile station 110, may include one or more parameters of communication channel resources (e.g., frequency slots, time-frequency, CDMA parameters, or the like) that mobile station 110 is required to utilize for reception.

Mobile stations 110, 120 and 170 may estimate their reception channels 111, 121 and 171, respectively, for example, using channel estimators 119, 129 and 170, respectively. Mobile stations 110 may transmit partial or complete receive-channel feedback ("Rx feedback") data to CP 130 through transmit channels 112, 122 and 172, respectively. The Rx feedback data may be received by receiver 132 of CP 130, and may be processed by processor 134 of CP 130. The Rx feedback data may include, for example, parameters indicating quality of one or more reception channels utilized and/or estimated by mobile stations 110, 120 and/or 170. In some embodiments, the Rx feedback data may optionally be compressed and/or decoded.

In accordance with some embodiments, CP 130 may allocate communication channel resources to mobile stations 110, 120 and/or 170, taking into account Rx feedback data received from mobile stations 110, 120 and/or 170. For example, in one embodiment, optimizer 153 and/or resource allocator 150 may calculate cost (e.g., overhead) associated with exchanging and/or handling Rx feedback data ("Rx feedback cost"), and may take into account one or more Rx feedback cost parameters upon allocation or re-allocation of communication channel resources. For example, optimizer 153 may determine which of various possible resource allocation permutations may be associated with a highest or relatively high net benefit parameter calculated, for example, by subtracting the Rx feedback cost and/or the control cost from the benefit (e.g., total throughput, individual component throughput, QoS, priority, or the like).

In some embodiments, mobile station 110 need not transmit to CP 130 Rx feedback data that includes substantially all the information that mobile station 110 may calculate using the channel estimator 119. For example, mobile station 110 may selectively transmit to CP 130 partial Rx feedback data, e.g., a part or portion of the information calculated by channel estimator 119, for example, selected in accordance with a Feedback Criteria Function (FCF). In some embodiments, FCFs may be pre-defined in one or more of mobile stations 110, 120 and/or 170, or may be periodically received by mobile stations 110, 120 and/or 170 from CP 130. In some embodiments, optionally, mobile stations 110, 120 and 170 may utilize different FCFs.

In some embodiments, for example, mobile station 110 may utilize a FCF to selectively transmit only Rx feedback data related to the best (e.g., highest-quality) R communication channel resources for which mobile station 110 calculated Rx feedback data, or related to the R communication channel resources having the highest SNR values, or related to the R communication channel resources associated with the highest channel quality indicator or channel quality value, or the like. In one embodiment, for example, such FCF may be used by mobile station 110 operating in a high-priority mode, e.g., executing a high-priority or critical wireless communication application, executing a streaming audio and/or streaming video application, or the like.

In other embodiments, for example, mobile station 120 may utilize a FCF to selectively transmit only Rx feedback data related to communication channel resources having a SNR value above a threshold value, or related to communication channel resources having a channel quality indicator above a threshold value, or related to communication channel resources having a channel quality value above a threshold value, or the like. In one embodiment, for example, such FCF may be used by mobile station 120 operating in a low-priority mode, e.g., associated with a user browsing the World Wide Web.

The FCF utilized by a mobile station may be selected by CP 130 based on one or more parameters, for example, a type of user associated with the mobile station, a type of application executed by the mobile station, a priority value or a QoS requirement associated with the mobile station or with an application executed by the mobile station, a bandwidth required by the mobile station or an application executed by the mobile station, the number of mobile stations in system 200, or the like. The CP 130 may dynamically modify the FCF utilized by a mobile station, e.g., periodically, based on performance history of the mobile station, based on current network conditions, based on current requirements of the mobile station and/or an application executed therein, or the like.

Figure 3:
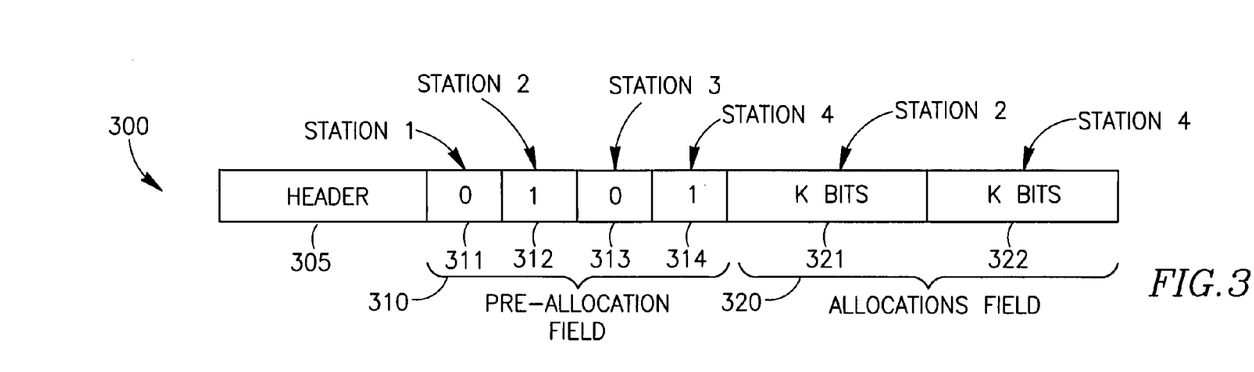
FIG. 3 is a schematic illustration of a variable length stations-oriented control block in accordance with an embodiment of the invention.

Reference is made to FIG. 3, which schematically illustrates a variable length stations-oriented control block 300 in accordance with an embodiment of the invention. Control block 300 may include compressed control information, for example, intended for transmission by CP 130 to mobile stations 110, 120 and 170 of FIGS. 1-2.

Control block 300 may include multiple fields, for example, a pre-allocation field 310 (e.g., a bitmap, a flags field, or the like) having a fixed length of bits, and an allocations field 320 having a variable length of bits. Pre-allocation field 310 may include multiple flags indicating to multiple, respective, mobile stations, whether their respective channel resource allocations are maintained or modified by control block 300. For example, in one embodiment, the pre-allocation field 310 may indicate whether or not mobile stations are required to modify their respective previously-allocated channel resources, whereas the allocations field 320 may indicate the allocation data only for the mobile stations that are required to modify their respective previously-allocated channel resources.

In the example shown in FIG. 3, pre-allocation field 310 includes four flags (e.g., four bits, four data items, or the like): a first flag 311 having a value of "0", indicating to a first mobile station that it is not required to modify its previously-allocated communication channel resource; a second flag 312 having a value of "1", indicating to a second mobile station that it is required to modify its previously-allocated communication channel resource in accordance with resource allocation information that follows in the allocations field 320 of control block 300; a third flag 313 having a value of "0", indicating to a third mobile station that it is not required to modify its previously-allocated communication channel resource; and a fourth flag 314 having a value of "1", indicating to a fourth mobile station that it is required to modify its previously-allocated communication channel resource in accordance with resource allocation information that follows in the allocations field 320 of control block 300. Accordingly, the allocations field 320 may include resource allocation information, e.g., control information, only for mobile station (s) that are required to modify their previous-allocated communication channel resources. The allocations field 320 need not include resource allocation information for mobile station (s) that are not required to modify their previously-allocated communication channel resources. In the example shown in FIG. 3, the allocations field 320 may include a first allocation data item 321 having resource allocation information for the second mobile station, followed by a second allocation data item 322 having resource allocation information for the fourth mobile station. In this example, the first and third mobile stations do not need to receive, and do not receive, resource allocation information. Therefore, overhead associated with controlling the first and third stations may be eliminated or reduced, thereby reducing the total control overhead.

In some embodiments, for example, a flag bit having a value of "1" may indicate that the channel resource allocation of a mobile station is modified by control block 300, whereas a flag bit having a value of "0" may indicate that the channel resource allocation of a mobile station is unmodified by control block 300, or vice versa. In the example shown in FIG. 3, the length of the pre-allocation field 310 may be four bits; if, for example, six bits are used for allocating a channel resource to a mobile station, then the length of the allocation field may be twelve bits, and the total length of the control block 300 may be 16 bits, e.g., instead of 24 bits required to represent uncompressed channel resource allocation information for four mobile stations.

In some embodiments, for example, system 100 may include M mobile stations, and K bits may be used for allocating a channel resource to a mobile station. Accordingly, the average total number of bits required for compressed control information data may be equal to $M \cdot (1+(1-P) \cdot K)$, wherein P may indicate an average probability that a mobile station maintains its previously-allocated channel resource. In some embodiments, utilizing compressed control blocks 300 may result in a compression factor greater than one, for example, a compression factor equal to $K/(1+(1-P) \cdot K)$. For example, in system 100 having an International Telecommunication Union (ITU) Pedestrian-B channel or environment, wherein M may be equal to 64 and K may be equal to 6, the value of P may be approximately 0.9 and the compression factor may be approximately 3.75.

In some embodiments, control block 300 may optionally include a header 305, for example, one or more fields or data items used for error management of control information, e.g., utilizing a Cyclic Redundancy Checksum (CRC) field. Header 305 may have a size of H bits, and may slightly increase the size of control block 300, but may allow detection and/or correction of control information errors. In one embodiment, for example, in a case in which substantially all mobile stations are required to modify their channel resource allocation, the maximum number of bits required for transmitting the control information may be denoted Lmax and may be equal to $M \cdot (K+1)+H$.

Some embodiments may include one or more error management mechanisms, for example, to handle situations in which resource allocation information is not properly received by mobile station 110, and/or mobile station 110 does not transmit data to CP 130. For example, after J consecutive iterations in which CP 130 does not send resource allocation information to mobile station 110, or in which CP 130 repeatedly sends a "0" flag to mobile station 110 in the pre-allocation field 310, the CP 130 may force a transmission of a "1" flag to mobile station 110, followed by the resource allocation information in the allocation field 320. This may allow, for example, a forced correction of errors in channel resource allocation, and the mobile station 110 may not lose more than J consecutive transmissions of resource allocation data. Additionally or alternatively, for example, CP 130 may periodically check and/or detect that mobile station 110 does not transmit using the channel resource allocated to mobile station 110; accordingly, CP 130 may force a transmission of a "1" flag to mobile station 110, followed by corrected resource allocation information in the allocation field 320. Other suitable error detection mechanisms and/or error correction mechanisms may be used.

Figure 4:
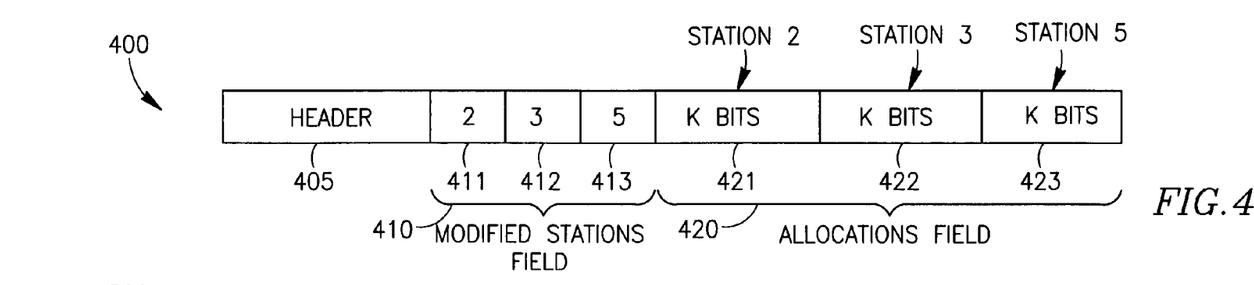
FIG. 4 is a schematic illustration of a fixed length stations-oriented control block in accordance with an embodiment of the invention.

Reference is made to FIG. 4, which schematically illustrates a fixed length stations-oriented control block 400 in accordance with an embodiment of the invention. Control block 400 may include control information, for example, intended for transmission by CP 130 to mobile stations 110, 120 and 170 of FIGS. 1-2.

Control block 400 may include multiple fields, for example, a fixed-length modified stations field 410, and a fixed-length allocations field 420. Modified stations field 410 may include multiple flags identifying multiple, respective, mobile stations whose channel resource allocations are modified by control block 400. For example, in one embodiment, the pre-allocation field 410 may include identifiers of mobile stations that are required to modify their respective previously-allocated channel resources; whereas the allocations field 420 may indicate the allocation data for these mobile stations only.

In the example shown in FIG. 4, modified stations field 410 includes three flags (e.g., three data items): a first flag 411 having a value of "2", indicating that a mobile station having an identifier value of "2" is required to modify its previously-allocated communication channel resource in accordance with the resource allocation information that follows in allocations field 420; a second flag 412 having a value of "3", indicating that a mobile station having an identifier value of "3" is required to modify its previously-allocated communication channel resource in accordance with the resource allocation information that follows in allocations field 420; and a third flag 413 having a value of "5", indicating that a mobile station having an identifier value of "5" is required to modify its previously-allocated communication channel resource in accordance with the resource allocation information that follows in allocations field 420. Various suitable station identifier parameters may be used, e.g., utilizing a unique global identifier, a Multipoint Communication Service (MCS) identifier or parameter, or the like.

Accordingly, the allocations field 420 may include resource allocation information for three mobiles stations required to modify their previous-allocated communication channel resources. Allocations field 420 may not include resource allocation information for mobile stations not required to modify their previously-allocated communication channel resources. Furthermore, allocations field 420 may not include resource allocation information for additional mobile stations which may be required to modify their previously-allocated communication channel resources, beyond the number of modified stations which may be represented in the modified stations field.

In the example shown in FIG. 4, the allocations field 420 may include a first allocation data item 421 having resource allocation information for the mobile station having an identifier value of "2"; a second allocation data item 422 having resource allocation information for the mobile station having an identifier value of "3"; and a third allocation data item 423 having resource allocation information for the mobile station having an identifier value of "5".

Modified stations field 410 may include L flags or data items; in FIG. 4, for example, L is equal to three. Using control block 400 may allow L resource allocation modifications to be performed, i.e., may allow L mobile stations to modify their channel resource allocation. In one embodiment, for example, the size of the modified stations field 410 may be equal to $$\left\lceil \text{Log}_2 \binom{M}{L} \right\rceil.$$

Other suitable fixed-length fields may be used.

In some embodiments, control block 400 may optionally include a header 405, for example, one or more fields or data items used for error management of control information, e.g., utilizing a CRC field. Header 405 may be, for example, similar to header 305 of FIG. 3. Other suitable error detection mechanisms and/or error correction mechanisms may be used.

Figure 5:
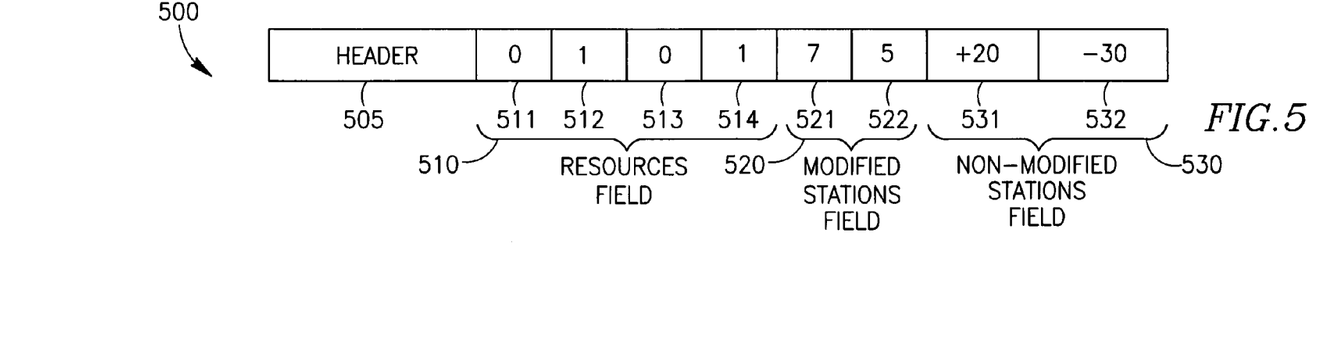
FIG. 5 is a schematic illustration of a resources-oriented control block in accordance with an embodiment of the invention.

Reference is made to FIG. 5, which schematically illustrates a resources-oriented control block 500 in accordance with an embodiment of the invention. Control block 500 may include compressed control information, for example, intended for transmission by CP 130 to mobile stations 110, 120 and 170 of FIGS. 1-2.

Control block 500 may include multiple fields, for example, a resources field 510 that has a fixed length of bits, and a modified stations field 520. Resources field 510 may include multiple flags or data items identifying multiple, respective, communication channel resources (e.g., frequency slots, sub-bands, portions of the spectrum, or the like). For example, in one embodiment, flags in the resources field 510 may indicate whether or not a communication channel resource previously-allocated to a first mobile station is re-allocated to a second, different, mobile station using control block 500. In one embodiment, for example, the resources field 510 may include flags indicating whether or not specific communication channel resources are re-allocated in control block 500; whereas the modified stations field 520 may indicate the allocation data for re-allocating the channel resources that are re-allocated.

In the example shown in FIG. 5, resources field 510 includes four flags (e.g., four bits, four data items, or the like): a first flag 511 having a value of "0", indicating that a first communication channel resource previously-allocated to a first mobile stations is not re-allocated to another mobile station; a second flag 512 having a value of "1", indicating that a second communication channel resource previously-allocated to a second mobile station is re-allocated to another mobile station; a third flag 513 having a value of "0", indicating that a first communication channel resource previously-allocated to a third mobile stations is not re-allocated to another mobile station; and a fourth flag 514 having a value of "1", indicating that a fourth communication channel resource previously-allocated to a fourth mobile station is re-allocated to yet another mobile station. Resources field 510 may include other flags, bits or data items to represent whether allocations of communication channel resources are modified or non-modified by control block 500.

The modified stations field 520 may include a first data item 521 having a value of "7", indicating that the second communication channel resource is re-allocated to a mobile station having an identifier of "7"; and a second data item 522 having a value of "5", indicating that the fourth communication channel resource is re-allocated to a mobile station having an identifier of "5".

Optionally, control block 500 may further include a non-modified stations field 530, for example, indicating modifications intended to be performed by mobile stations whose channel resource allocation is non-modified using block 500. For example, non-modified stations 530 may include data indicating that one or more stations whose channel resource allocation is non-modified are required to modify, e.g., decrease or increase, their transmit power.

In the example shown in FIG. 5, flag 531 (which corresponds to the first mobile station, according to flag 511) may include an indication that the first mobile station is required to increase its transmit power by 20 percent; and flag 532 (which corresponds to the third mobile station, according to flag 513) may include an indication that the third mobile station is required to decrease its transmit power by 30 percent. Other suitable instructions may be indicated using field 530; and field 530 may be used with other types of control blocks.

In some embodiments, control block 500 may optionally include a header 505, for example, one or more fields or data items used for error management of control information, e.g., utilizing a CRC field. Header 505 may be, for example, similar to header 305 of FIG. 3. Other suitable error detection mechanisms and/or error correction mechanisms may be used.

In some embodiments, headers 305, 405 and/or 505 may optionally include an indication of a control block type, e.g., an indication that the control block is a fixed-length type control block, an indication that the control block is a variable-length type control block, an indication that the control block is a stations-oriented control block, an indication that the control block is a resources-oriented control block, or the like. For example, in one embodiment, the number of communication channel resources may be significantly greater than the number of mobile stations, and a stations-oriented control block may be used; whereas in another embodiment, the number of communication channel resources may be significantly smaller than the number of mobile stations, and a resources-oriented control block may be used. Embodiments of the invention may utilize various suitable combinations of fixed-length fields or control blocks, variable-length fields or control blocks, stations-oriented fields or control blocks, and/or resources-oriented fields or control blocks.

Figure 6:
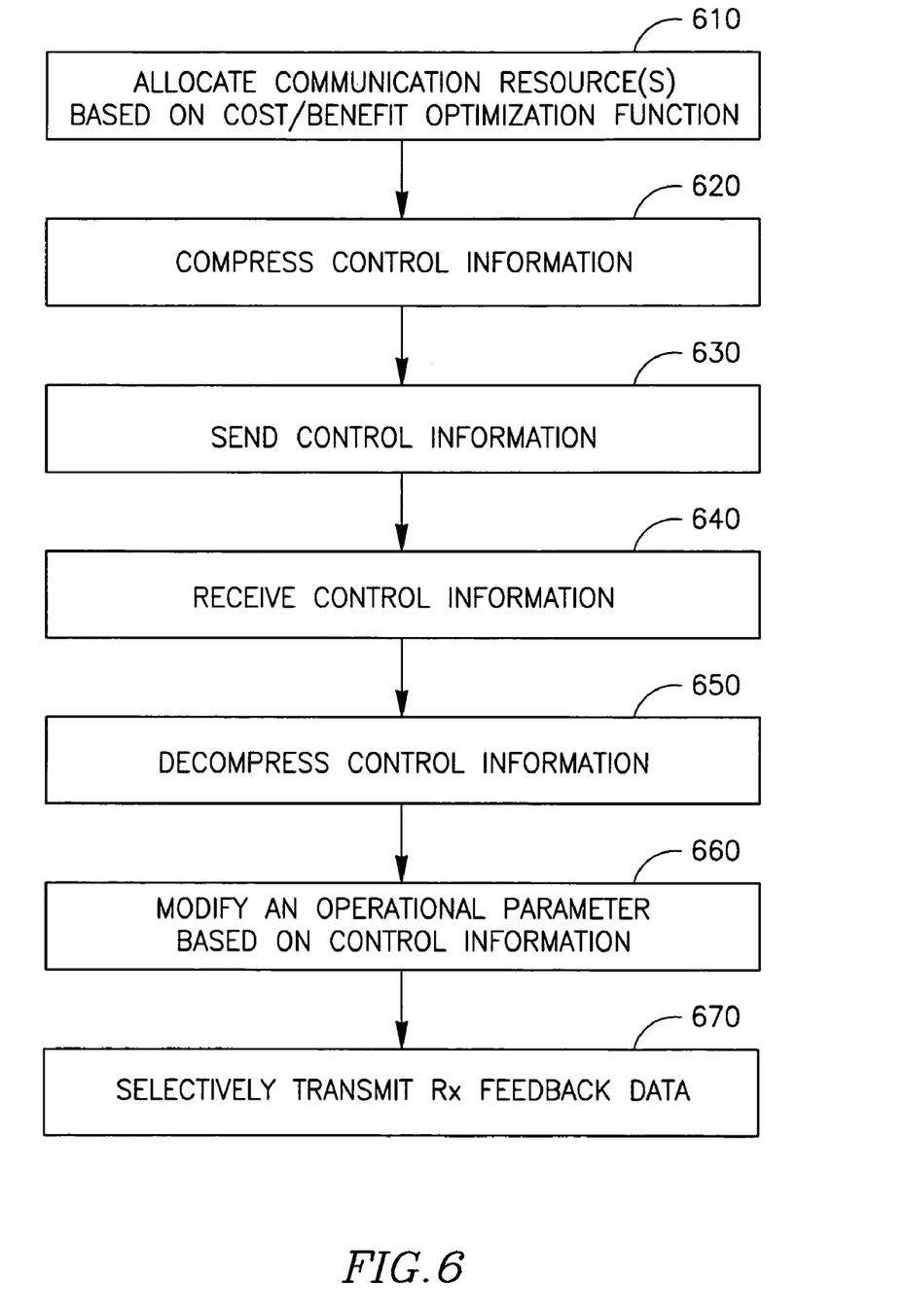
FIG. 6 is a schematic block flow-chart of a method of point to multipoint control in accordance with an embodiment of the invention.

FIG. 6 is a schematic flow-chart of a method of point to multipoint control in accordance with an embodiment of the invention. Operations of the method may be implemented, for example, by system 100 of FIG. 1, by system 200 of FIG. 2, and/or by other suitable central points, stations, mobile stations, servicing stations, access points, controllers, modems, processors, devices, and/or systems.

As indicated at box 610, the method may include, for example, allocating communication channel resource(s), e.g., selecting a resource allocation permutation, based on a cost/benefit optimization function or a net benefit function. This may include, for example, taking into account or otherwise utilizing a benefit (e.g., throughput, QoS, or the like), optionally taking into account the cost (e.g., overhead) associated with exchanging and/or processing control information, and optionally taking into account the cost (e.g., overhead) associated with exchanging and/or processing receive-channel feedback data. The selected resource allocation permutation may be included in control information intended for transmission to one or more mobile stations.

As indicated at box 620, the method may optionally include, for example, compressing the control information, e.g., as described above with reference to FIGS. 3-5.

As indicated at box 630, the method may include, for example, sending (e.g., transmitting or broadcasting) the control information, e.g., by a central point to one or more mobile stations.

As indicated at box 640, the method may include, for example, receiving the control information, e.g., by one or more mobile stations.

As indicated at box 650, the method may optionally include, for example, decompressing the control information, e.g., by one or more mobile stations.

As indicated at box 660, the method may include, for example, modifying an operational parameter of a mobile station based on the control information. For example, a mobile station may modify its operation to utilize a specific communication channel resource, e.g., frequency slot, based on the control information.

As indicated at box 670, the method may optionally include, for example, transmitting Rx feedback data, e.g., by one or more mobile stations to the central point. This may include, for example, selectively transmitting partial Rx feedback data, e.g., related to the R channel resources having the highest SNR values, related to the channel resources having a SNR value higher than a threshold, or the like.

The method may optionally include, for example, repeating some or all of the above operations, e.g., periodically or at pre-defined time intervals.

Other suitable operations or sets of operations may be used in accordance with embodiments of the invention.

For example, in some embodiments, the method may include allocating a wireless communication channel resource to one or more stations of a wireless communication system based on a net benefit function that takes into account an overhead incurred by controlling the allocation of said channel resource. The method may optionally include, for example, calculating a net benefit parameter of said wireless communication system corresponding to one or more possible allocations of said channel resource. The method may optionally include, for example, calculating said net benefit parameter by subtracting a value related to said overhead from a value related to a gross benefit parameter of said wireless communication system. The method may optionally include, for example, substantially improving or substantially maximizing said net benefit parameter over a plurality of different possible allocation permutations of said channel resource. The method may optionally include, for example, selecting, out of a plurality of possible allocation permutations of said channel resource, an allocation permutation that yields a maximum value of said net benefit parameter. The method may optionally include, for example, calculating said gross benefit parameter based on a total throughput of said wireless communication system. The method may optionally include, for example, calculating said gross benefit parameter based on a throughput of one or more of said stations. The method may optionally include, for example, calculating said net benefit parameter based on said overhead, said gross benefit parameter, and a receive-channel feedback cost parameter of said wireless communication system. The method may optionally include, for example, compressing the control information, and transmitting a signal carrying said compressed control information.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by CP 130, by processor 134, by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 135), memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a resource allocator to allocate wireless communication channel resources to a plurality of stations of a wireless communication system,
wherein the resource allocator is to calculate a plurality of net benefit parameter values corresponding to a respective plurality of different resource allocation permutations, each permutation defining a different allocation of the resources to the stations,
wherein the calculation of the net benefit parameter value corresponding to each allocation permutation is based on a net benefit function, which takes into account an overhead cost incurred by communication with the stations in accordance with the allocation permutation,
wherein the resource allocator is to select out of the plurality of different allocation permutations an allocation permutation that optimizes the net benefit parameter, and to allocate the wireless communication channel resources according to the selected allocation permutation, and wherein said net benefit parameter is calculated by subtracting a value related to said overhead from a value related to a gross benefit parameter of said wireless communication system.

2. The apparatus of claim 1, wherein the resource allocator is to store one or more of a set of calculated control-cost parameter values, a set of calculated gross benefit parameter values, and a set of calculated net benefit parameter values, corresponding to different associations between the plurality of stations and a plurality of resources,
and wherein the resource allocator is to calculate the plurality of net benefit parameter values based on the one or more stored sets of values.

3. The apparatus of claim 1, wherein said resource allocator is to select an allocation permutation that yields a maximum value of said net benefit parameter.

4. The apparatus of claim 1, wherein said gross benefit parameter relates to a total throughput of said wireless communication system.

5. The apparatus of claim 1, wherein said gross benefit parameter relates to a throughput of one or more of said stations.

6. The apparatus of claim 1, wherein said gross benefit parameter relates to a Quality of Service parameter of said wireless communication system.

7. The apparatus of claim 1, wherein said net benefit function is a function of said overhead, said gross benefit parameter, and a receive-channel feedback cost parameter of said wireless communication system.

8. The apparatus of claim 7, wherein the net benefit parameter value corresponding to each allocation permutation is calculated by subtracting a value related to the overhead associated with the allocation permutation, and a value related to the receive-channel feedback cost parameter associated with the allocation permutation, from a value related to the gross benefit parameter associated with the allocation permutation.

9. The apparatus of claim 1, wherein said net benefit function takes into account a partial receive-channel feedback selectively transmitted by a station of said one or more stations that is able to calculate a receive-channel feedback.

10. The apparatus of claim 9, wherein said partial receive-channel feedback includes a receive-channel feedback related to a predefined number of communication channel resources having a high Signal to Noise Ratio value.

11. The apparatus of claim 9, wherein said partial receive-channel feedback includes a receive-channel feedback related to one or more communication channel resources having a Signal to Noise Ratio value greater than a threshold.

12. The apparatus of claim 1, wherein said wireless communication channel resources include at least one resource selected from the group consisting of: a frequency slot, a time slot, a time/frequency slot, a frequency range, and a cluster of frequency ranges.

13. An apparatus comprising:
a resource allocator to allocate wireless communication channel resources to a plurality of stations of a wireless communication system;
a compressor to generate compressed control information by compressing at least part of control information that includes allocation data generated by said resource allocator; and
a transmitter to transmit said compressed control information to said stations,
wherein the resource allocator is to calculate a plurality of net benefit parameter values corresponding to a respective plurality of different resource allocation permutations, each permutation defining a different allocation of the resources to the stations,
wherein the calculation of the net benefit parameter value corresponding to each allocation permutation is based on a net benefit function, which takes into account an overhead cost incurred by communication with the stations in accordance with the allocation permutation,
and wherein the resource allocator is to select out of the plurality of different allocation permutations an allocation permutation that optimizes the net benefit parameter, and to allocate the wireless communication channel resources according to the selected allocation permutation.

14. The apparatus of claim 13, wherein said compressor is to generate a control block having at least a resource identification field including one or more flags to identify one or more resources to be re-allocated, and a station identification field including one or more flags identifying one or more stations to which the one or more resources are to be re-allocated, respectively.

15. The apparatus of claim 13, wherein said compressor is to generate the control information in the form of a control block including information representing a modification of a previous allocation of said resources.

16. The apparatus of claim 13, wherein said compressor is to generate a control block having at least a station identification field including one or more flags to identify one or more of said stations for which a previous allocation of said channel resources is to be modified, and an allocations field including control data to control allocation of said channel resources to the one or more identified stations.

17. A method comprising:
calculating a plurality of net benefit parameter values corresponding to a respective plurality of different resource allocation permutations, each permutation defining a different allocation of wireless communication channel resources to a plurality of stations of a wireless communication system, wherein calculating the plurality of net benefit parameter values includes calculating a net benefit parameter value corresponding to each allocation permutation based on a net benefit function, which takes into account an overhead cost incurred by communication with the stations in accordance with the allocation permutation;
selecting out of the plurality of different allocation permutations, an allocation permutation that optimizes the net benefit parameter; and
allocating the wireless communication channel resources according to the selected allocation permutation,
wherein calculating the net benefit parameter value comprises calculating said net benefit parameter value by subtracting a value related to said overhead from a value related to a gross benefit parameter of said wireless communication system.

18. The method of claim 17 comprising storing one or more of a set of calculated control-cost parameter values, a set of calculated gross benefit parameter values, and a set of calculated net benefit parameter values, corresponding to different associations between the plurality of stations and a plurality of resources, wherein calculating the plurality of net benefit parameter values comprises calculating the plurality of net benefit parameter values based on the one or more stored sets of values.

19. The method of claim 18, wherein selecting the allocation permutation comprises:
selecting an allocation permutation that yields a maximum value of said net benefit parameter.

20. The method of claim 17, comprising:
calculating said gross benefit parameter based on a total throughput of said wireless communication system.

21. The method of claim 17, comprising:
calculating said gross benefit parameter based on a throughput of one or more of said stations.

22. The method of claim 17, wherein calculating the net benefit parameter value corresponding to each allocation permutation comprises:
calculating the net benefit parameter based on the overhead associated with the allocation permutation, the gross benefit parameter associated with the allocation permutation, and a receive-channel feedback cost parameter of said wireless communication system.

23. A method comprising:
calculating a plurality of net benefit parameter values corresponding to a respective plurality of different resource allocation permutations, each permutation defining a different allocation of wireless communication channel resources to a plurality of stations of a wireless communication system, wherein calculating the plurality of net benefit parameter values includes calculating a net benefit parameter value corresponding to each allocation permutation based on a net benefit function, which takes into account an overhead cost incurred by communication with the stations in accordance with the allocation permutation;
selecting out of the plurality of different allocation permutations, an allocation permutation that optimizes the net benefit parameter;
allocating the wireless communication channel resources according to the selected allocation permutation;
generating compressed control information by compressing at least part of control information that includes allocation data generated by said allocating; and
transmitting said compressed control information to the plurality of stations.

24. A wireless communication device comprising:
a resource allocator to allocate wireless communication channel resources to a plurality of stations of a wireless communication system; and
a dipole antenna coupled to said resource allocator to transmit and receive wireless communication signals,
wherein the resource allocator is to calculate a plurality of net benefit parameter values corresponding to a respective plurality of different resource allocation permutations, each permutation defining a different allocation of the resources to the stations,
wherein the calculation of the net benefit parameter value corresponding to each allocation permutation is based on a net benefit function, which takes into account an overhead cost incurred by communication with the stations in accordance with the allocation permutation,
wherein the resource allocator is to select out of the plurality of different allocation permutations, an allocation permutation that optimizes the net benefit parameter, and to allocate the wireless communication channel resources according to the selected allocation permutation,
and wherein said net benefit parameter is calculated by subtracting a value related to said overhead from a value related to a gross benefit parameter of said wireless communication system.

25. The wireless communication device of claim 24 comprising:
a compressor to generate compressed control information by compressing at least part of control information that includes allocation data generated by said resource allocator; and
a transmitter to transmit said compressed control information to said stations via said antenna.

* * * * *